United States Patent
Lutz et al.

(10) Patent No.: US 10,155,838 B2
(45) Date of Patent: Dec. 18, 2018

(54) STRUCTURAL PU ADHESIVE FOR COMPOSITE BONDING

(71) Applicant: Dow Global Technologies LLC, Midland, MI (US)

(72) Inventors: Andreas Lutz, Galgenen (CH); Daniel Schneider, Waedenswil (CH); Stefan Schmatloch, Thalwil (CH); Ilona Caderas, Goldingen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/898,916

(22) PCT Filed: Jul. 24, 2014

(86) PCT No.: PCT/US2014/048000
§ 371 (c)(1),
(2) Date: Dec. 16, 2015

(87) PCT Pub. No.: WO2015/017244
PCT Pub. Date: Feb. 5, 2015

(65) Prior Publication Data
US 2016/0369038 A1    Dec. 22, 2016

Related U.S. Application Data

(60) Provisional application No. 61/860,285, filed on Jul. 31, 2013.

(51) Int. Cl.
C08G 18/32    (2006.01)
C08G 18/67    (2006.01)
C08G 18/50    (2006.01)
C08G 18/79    (2006.01)
C08G 18/08    (2006.01)
(Continued)

(52) U.S. Cl.
CPC ....... *C08G 18/675* (2013.01); *C08G 18/0885* (2013.01); *C08G 18/227* (2013.01); *C08G 18/3215* (2013.01); *C08G 18/3228* (2013.01); *C08G 18/5024* (2013.01); *C08G 18/798* (2013.01); *C09J 175/08* (2013.01)

(58) Field of Classification Search
CPC ............... C08G 18/675; C08G 18/227; C08G 18/3228; C08G 18/5024; C08G 18/798; C09J 175/08
See application file for complete search history.

(56) References Cited

U.S. PATENT DOCUMENTS 4,578,424 A * 3/1986 Goel .................... C08G 18/58
525/109
5,155,243 A * 10/1992 Fujiwa ................. C07D 303/16
549/529
(Continued)

FOREIGN PATENT DOCUMENTS

EP    0325058 A1    7/1989
EP    1433802 B1    6/2004
(Continued)

OTHER PUBLICATIONS

English Translation of Document N.*

*Primary Examiner* — Michael L Leonard

(57) ABSTRACT

A new polyurethane (PU) adhesive composition having unique properties in automotive related applications such as composite bonding.

4 Claims, 2 Drawing Sheets 1,3-bis(3-isocyanato-4-methylphenyl)-1,3-diazetidine-2,4-dione
Metalink U 1,3-bis(3-isocyanato-4-methylphenyl)urea
Metalink H 1,3-bis(4-(4-isocyanatobenzyl)phenyl)-1,3-diazetidine-2,4-dione
Dimeres MDI (Uretdion)

(51) Int. Cl.
*C08G 18/22* (2006.01)
*C09J 175/08* (2006.01)

(56) References Cited

U.S. PATENT DOCUMENTS

| | | | |
|---|---|---|---|
| 5,569,733 A * | 10/1996 | Donnelly | C07C 275/14 |
| | | | 427/372.2 |
| 5,710,215 A * | 1/1998 | Abend | C08G 18/10 |
| | | | 427/398.1 |
| 6,686,416 B2 | 2/2004 | Guse et al. | |
| 9,011,630 B2 | 4/2015 | Burckhardt et al. | |
| 9,074,040 B2 | 7/2015 | Turshani et al. | |
| 2003/0149194 A1* | 8/2003 | Chow | C08G 18/581 |
| | | | 525/528 |
| 2006/0276601 A1* | 12/2006 | Lutz | C08G 18/10 |
| | | | 525/528 |
| 2009/0123757 A1 | 5/2009 | Pudleiner et al. | |
| 2011/0111208 A1* | 5/2011 | D'Herbecourt | B32B 7/12 |
| | | | 428/323 |

FOREIGN PATENT DOCUMENTS

| | | | | |
|---|---|---|---|---|
| EP | 1876197 A2 | 1/2008 | | |
| WO | 1998/013406 A1 | 4/1998 | | |
| WO | WO-98/13406 * | 4/1998 | | C08G 18/70 |
| WO | 2001/57110 A1 | 8/2001 | | |

* cited by examiner

Chemical Structure of Some Dimeric Isocynates 1,3-bis(3-isocyanato-4-methylphenyl)-1,3-diazetidine-2,4-dione Metalink U 1,3-bis(3-isocyanato-4-methylphenyl)urea Metalink H 1,3-bis(4-(4-isocyanatobenzyl)phenyl)-1,3-diazetidine-2,4-dione Dimeres MDI (Urtdion)

FIGURE 2

Table 2 Sample components and amounts used

| Raw Materials | A | B | C | D | E | G |
|---|---|---|---|---|---|---|
| | Inv | Inv | Inv | Ref | Ref | Ref |
| Premix 1 | | | | | | |
| Voranol 1010L | 3.28 | 3.25 | 3.28 | 3.39 | 2.50 | 2.11 |
| Jeffamine D-400 | 0.19 | 0.22 | 0.22 | 0.23 | 0.11 | 0.28 |
| Jeffamine ED-600 | 0.19 | 0.22 | 0.22 | 0.23 | 0.11 | 0.28 |
| Premix 2 | | | | | | |
| Voranol CP4610 | 22.06 | 21.83 | 22.05 | 24.90 | 15.00 | 31.18 |
| Jeffamine D-400 | 1.03 | 1.18 | 1.13 | 1.23 | 0.57 | 1.48 |
| Jeffamine ED-600 | 1.03 | 1.18 | 1.13 | 1.23 | 0.57 | 1.48 |
| Metalink U - Nadeln | 20.75 | 23.76 | 22.72 | 24.83 | 11.59 | 29.96 |
| Premix 1 | 3.66 | 3.69 | 3.72 | 3.85 | 2.72 | 2.67 |
| Jeffamine T-5000 | 1.77 | 1.75 | 1.77 | 1.82 | 2.50 | 1.92 |
| Main-Mixture | | | | | | |
| Voranol CP 4610 | 5.73 | 5.67 | 5.73 | 3.92 | 24.46 | 0.00 |
| Voranol 1010L | 6.84 | 6.77 | 6.84 | 7.07 | 11.88 | 0.00 |
| Voranol CP450 | 1.37 | 1.49 | 0.50 | 11.23 | 0.00 | 16.90 |
| o,o'-diallylbisphenol A | 7.67 | 9.75 | 10.00 | 0.00 | 0.00 | 0.00 |
| BiCat 8108M | 1.12 | 1.11 | 1.11 | 1.11 | 1.11 | 1.11 |
| Purmol 4ST | 4.48 | 4.00 | 4.48 | 4.18 | 4.25 | 4.32 |
| Polstar 200R | 22.42 | 6.93 | 18.13 | 6.27 | 9.85 | 2.11 |
| Printex 30 | --- | 10.89 | --- | 8.36 | 15.50 | 6.87 |
| Araldite DW 013 Blue | 0.07 | --- | 0.19 | --- | --- | --- |
| Cabosil T-720 | --- | --- | 0.50 | --- | --- | --- |
| Premix 2 | 50.30 | 53.39 | 52.52 | 57.86 | 32.95 | 68.69 |
| Total: | 100.00 | 100.00 | 100.00 | 100.00 | 100.00 | 100.00 |

STRUCTURAL PU ADHESIVE FOR COMPOSITE BONDING

FIELD OF THE INVENTION

The present invention relates to a new polyurethane (PU) adhesive composition having unique properties in automotive related applications such as composite bonding.

INTRODUCTION

Structural composite bonding of automotive parts or entire modules often requires immediate bond strength after assembly with high moduli (approx. 100 to 300 MPa) with relatively high elongation at break (100 to 200%). For ease of processing, simple application with one-component (1K) composition is desired. Also desired is the composition's adhesion to carbon fiber reinforced polymers (CFRP) or sheet molding compound (SMC) parts without activation and with flexibility in open time (assembly of parts after adhesive application). Current commercially available two component (2K) PU adhesive compositions typically require complex application systems and complex processing steps. They also exhibit limited flexibility in open time. Epoxy-based adhesives, however, require relatively high oven temperatures to cure the resins.

SUMMARY OF THE INVENTION

The present invention provides a composition with significantly higher elastic modulus (e-modulus) and is heat curable above 80° C. to about 150° C. Specifically, the present invention provides a 1K PU composition with elastic modulus of above 50 MPa, above 100 MPa in some preferred embodiments, and above 200 MPa in some more preferred embodiments. Such a higher e-modulus property of the adhesive composition is required for structural composite bonding. The loss of the bulk elongation with increased modulus is acceptable in the industry. The high modulus of the adhesive composition is achieved by including poly-phenol compounds, such as Bisphenol A, M or derivates thereof in the composition. In a preferred embodiment, o,o'-diallyl-bisphenol A (ODBA) is included in the adhesive composition. In another embodiment, higher functional aliphatic polyols are used. In yet another embodiment, polyphenols are used in additions to higher functional aliphatic polyols to minimize the loss of bulk elongation. The higher functional aliphatic polyols can be selected from short chain higher functional polyols like trimethylolpropane (TMP), Voranol™ CP 450 (available from The Dow Chemical Company), and pentaerithrol. In yet another embodiment, a similar high modulus can be achieved with the use of aliphatic polyols (functionality greater than 2) while bulk elongation is significantly lower.

BRIEF DESCRIPTION OF DRAWINGS

FIG. 2 is a table indicating the ingredients and amounts of those ingredients used in Samples A-E and G.

DETAILED DESCRIPTION OF THE INVENTION

The high modulus of the present composition is achieved by using poly-phenol compounds, such as Bisphenol A, M, K or derivates thereof and preferably o,o'-diallyl-bisphenol A (ODBA) in the adhesive composition. Aliphatic polyols with functionality greater than 2 such as Voranol™ CP 450 or Voranol™ CP4610 may also be used. In some embodiments, bisphenol A and bisphenol A based chemical structures, including hydroxyalkyl-substituted structures up to $C_3$, phenol based structures with one or more hydroxyl-groups or hydroxyalkyl-substituted structures up to $C_5$ are used. In a preferred embodiment of the present invention, o,o'-diallyl-bisphenol A is used. The composition typically comprises 0.1 to 80 wt %, preferably 1 to 60 wt %, and more preferably 3 to 50 wt % of such poly-phenols, based on the total weight of the composition.

Figure 1:
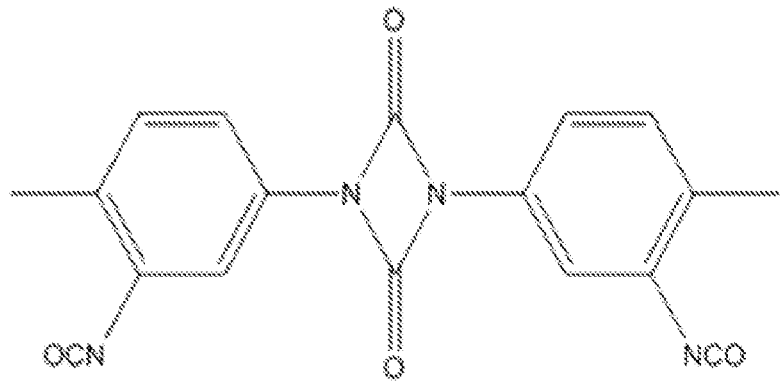
FIG. 1 is an illustration of some of the chemical structure of dimeric isocyanates used in the present invention.
Figure 1:
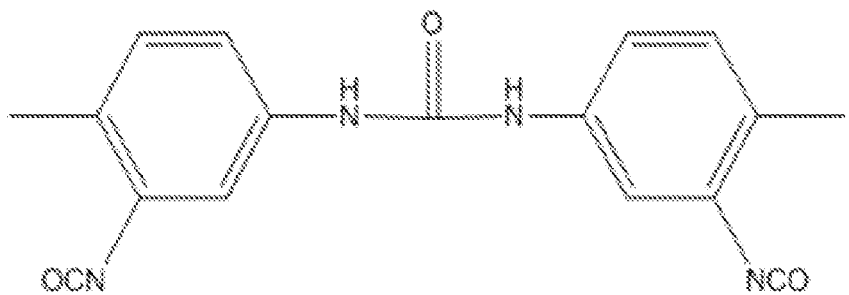
Figure 1:
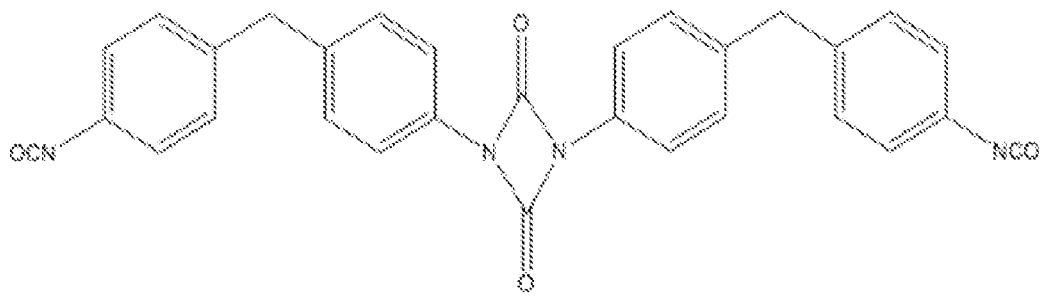

In addition to the above described poly-phenols, the present composition also comprises encapsulated dimeric isocyanates such as dimeric toluene diisocyanate (TDI-uretdion or Metalink U; or TDI-urea—Metalink H), dimeric methylene diphenyl diisocyanate (MDI-uretdion) (available from The Dow Chemical Company or Acima) or a mixture thereof. FIG. 1 illustrates the chemical structures of some dimeric isocyanates examples used in the present invention. The encapsulating process is known in the industry and is similar to those described in EP 1433802 and EP1876197, both of which are incorporated herein in their entireties. The present composition typically comprises 1 to 80 wt %, preferably 3 to 60 wt %, and more preferably 5 to 50 wt % of such encapsulated dimeric isocyanates, based on the total weight of the composition.

Furthermore, some amines are used in the present invention Amines are used to form the encapsulating by disactivating the dimeric isocyanates agglomerate surface. Polyamines such as those from the Jeffamine series (available from Huntsman), e.g., Jeffamine D 230, D 400, ED 600, T 403, and all other linear aliphatic diamines from $C_4$ up to $C_{20}$ may be used in the present invention. These polyamines are used to deactivate by encapsulation the dimeric isocyanate. The present composition may contain, based on the total weight of the composition, 0.5 to 5 wt %, preferably 0.8 to 5 wt %, and more preferably 1 to 4 wt % of amines.

In some embodiments of the present invention, the adhesive composition comprises Jeffamin T-5000. If the encapsulation is not stable, the encapsulating material will partially gel by adding Jeffamine T-5000. In such embodiments, the composition may contain, based on the total weight of the composition, 0.5 to 5 wt %, preferably 0.8 to 3 wt %, and more preferably 1 to 2 wt % of Jeffamine T-5000.

The present composition also comprises one or more catalysts in the amount of 0.001 to 5 wt %, preferably 0.01 to 2 wt % and more preferably 0.02 to 1.5 wt % based on the total weight of the composition. Examples of such catalysts include Sn—, Zr —, Ti-metallo-organic and preferably Bi-neodecanoate, and more preferably these mentioned catalyst compounds in combination with chelating ligands.

The present composition may also include some fillers in the amount of 1 to 80 wt %, preferably 6 to 60 wt %, and more preferably 8 to 40 wt % based on the total weight of the composition. The fillers used in the present invention include carbon black, kaolin type based filles, e.g., Pole-Star™ R200 (available from Imerys), talcum, $CaCO_3$, etc.

EXAMPLES

The present invention can be further demonstrated with the following non-limiting examples.

Testing Methods

E-modulus, tensile strength and elongation, dumbbell specimen, was tested using DIN EN ISO 527-1. Dumbbell specimen dimension 5A.

Lap shear was tested using DIN EN 1465 with bonding dimension of 10×25 mm and adhesive layer thickness of 2 mm.

E-coat is tested using Cathoguard 500 supplied by BASF, coating thickness: 20-22 μm+/−2-3 μm Raw Material List and Sources Table 1 describes the raw materials used in preparation of samples and their sources.

TABLE 1

Raw Materials

| | Supplier | Chemistry |
|---|---|---|
| Polyols | | |
| Voranol ™ 1010L | DOW | 1000 Da polypropylene oxide (PPO) Diol |
| Voranol ™ CP4610 | DOW | 4800 Da 89% PPO/11% EO Triol |
| Voranol ™ CP450 | DOW | 450 Da PPO Triol |
| Isocyanates: | | |
| Metalink ™ U | Isochem/DOW | 1,3-bis(3-isocyanato-4-methylphenyl)-1,3-diazetidine-2,4-dione |
| Bisphenols: | | |
| Mile Res ™ 550 | MPI Chemie BV | o,o'-diallylbisphenol A |
| Amines: | | |
| Jeffamine ™ D-400 | Huntsman | 400 Da polyether-diamine |
| Jeffamine ™ ED-600 | Huntsman | 600 Da polyether-diamine |
| Jeffamine ™ T-5000 | Huntsman | 5000 Da polyether-triamine |
| Catalyst: | | |
| BiCat ™ 8108 | Shepherd Chemical Comp. | Bismuth-III-Neodecanoat (20% Bi) |
| Molecular Sieve: | | |
| Purmol ™ 4ST | Uetikon Chemie | 4A molecular sieve |
| Fumed Silica: | | |
| Cabosil ™ T-720 | Cabot Corporation | Fumed silica |
| Carbon Black: | | |
| Printex ™ 30 | Evonik | |
| Calcinated Kaolin: | | |
| Polestar ™ 200R | Imerys | |
| Colorants | | |
| Araldite ™ DW 0135 | Huntsman | |

Preparation of Samples

Table 2 summarizes the components and amounts thereof used in preparing both the inventive and the comparative samples. Samples A, B, and C are embodiments of the present invention while Samples D, E, and G were comparative (Ref) samples prepared for comparing with the present invention samples. Inventive samples A to C contain polyphenolic compounds such as o,o'-diallylbisphenol A (ODBA), which improves the elastic modulus and the mechanical strength (e.g., lap shear strength) while keeping the bulk elongation comparable to the comparative Samples D to G. The inventive compositions use different amounts of ODBA and only little amounts of low molecular weight diols. The comparative samples contain no ODBA but use a significant higher amount of low molecular weight diols (Voranol CP 450) with Samples D and G. Comparative Sample E contains neither the low molecular weight diols nor ODBA.

All samples listed in Table 2 were prepared with the following procedures:

Samples B, D, E and G (compostions with carbon black)

Premix 1:

Add the listed amounts of Voranol 1010L, Jeffamine D-400 and Jeffamine ED-600 into a laboratory planetary mixer and mix it under nitrogen for 5 min at 10 Hz and 50° C.

Premix 2:

Add the listed amounts of Voranol CP4610, Jeffamine D-400, and Jeffamine ED-600 into a lab planetary mixer and mix it under nitrogen for 5 min at 10 Hz and 50° C. Then add the listed amounts of Metalink U under nitrogen for 10 min at 10 Hz and 50° C. After this step, add the listed amounts of the premix 1 into the lab planetary mixer and mix it under nitrogen for 10 min at 10 Hz and 50° C. For the control of the encapsulation, add Jeffamine T-5000 to the mixture and mix it for 5 min under nitrogen at 10 Hz and 50° C. If no gelling is observed, the encapsulation of the polyisocyanate is considered acceptable for next steps.

Main Mixture:

Add the listed amounts of Voranol CP4610, Voranol 1010L, Voranol CP450 Mile-Res 550 (o,o'-diallyl bishenol A), BiCat 8108, Printex 30, Polestar 200R, and Purmol 4ST into a lab planetary mixer and mix it under nitrogen for 15 min at 10 Hz and 35° C.

Then add the listed amounts of premix 2 and mix the mixture under nitrogen for 10 min at 10 Hz and 35° C. Then apply vacuum to the lab planetary mixer and mix it for additional 20 min at 10 Hz and 35° C. for degassing.

Samples A and C (Compositions without Carbon Black C)

Premix 1:

Add the listed amounts of Voranol 1010L, Jeffamine D-400, and Jeffamine ED-600 into a lab planetary mixer and mix it under nitrogen for 5 min at 10 Hz and 50° C.

Premix 2:

Add the listed amounts of Voranol CP4610, Jeffamine D-400, and Jefamine ED-600 into a lab planetary mixer and mix it under nitrogen for 5 min at 10 Hz and 50° C. Then add the listed amounts of Metalink U under nitrogen for 10 min at 10 Hz and 50° C. After this step, unadd the listed amounts of the premix 1 into the lab planetary mixer and mix it under nitrogen for 10 min at 10 Hz and 50° C. For the control of the encapsulation, add the listed amounts of Jeffamin T-5000 to the mixture and mix it for 5 min under nitrogen at 50 Hz and 5° C. If no gelling is observed, the encapsulation of the polyisocyanate is acceptable.

Main Mixture:

Add the listed amounts of Voranol CP4610, Voranol 1010L, Voranol CP450, Mile-Res 550 (o,o'-diallyl bishenol), BiCat 8108, Cabosil T-720, Polestar 200R, Alraldite DW 015 Blue, and Purmol 4ST into a lab planetary mixer and mix it under nitrogen for 15 min at 10 Hz and 35° C. Then, add the listed amounts of premix 2 and mix the mixture under nitrogen for 10 min at 10 Hz and 35° C. Then apply vacuum to the lab planetary mixer and mix it for additional 20 min at 10 Hz and 35° C. for degassing.

Testing Results

The samples were subject to some mechanical performance tests and the test results are summarized below in Table 3.

TABLE 3

Mechanical Performance

Curing conditions:
105° C./15 min LS
105° C./30 min TS
2 h RT after curing

| | A inv | B inv | C inv | D ref | E ref | G ref |
|---|---|---|---|---|---|---|
| E-modulus [MPa] | 124 | 241 | 164 | 170 | 37 | 259 |
| Elongation [%] | 149 | 111 | 151 | 63 | 150 | 70 |
| Tensile strength [MPa] | 13.7 | 16.2 | 13.9 | 9.2 | 6.0 | 13.5 |
| Lap shear strength [MPa] on e-coated steel 2 mm bonding high | 13.7 | 16.2 | 13.9 | 10.3 | 9.8 | 11.0 |

Table 3 clearly demonstrated that all inventive Samples A to C show high elongation values, high elastic moduli, and higher lap shear strength values. The comparative Samples D and G, with higher amount of low molecular weight diols but no ODBA, showed high elastic moduli but reduced bulk elongation and mechanical strength values. Comparative Sample E, which contains no low molecular weight diol and no ODBA, showed significantly lower e-moduli but similar bulk elongation as in some inventive samples.

The use of rigid polyphenolic compounds like ODBA over commonly used lower molecular weight diols showed significant improvement of the bulk elongation at similar elastic-moduli. A higher bulk elongation leads to better crash performance of the adhesively bonded joint.

Table 4 illustrates the lap shear results of adhesively bonded carbon fiber reinforced polymer (obtained from Audi) or plastic substrates. The inventive formulation B, which uses o,o'-diallyl-bisphenol A, shows high static lap shear strength and good cohesive failure mode over the comparative/reference formulation E.

TABLE 4

Lap shear strength on composite material

| | B inventive | E reference |
|---|---|---|
| Lap shear strength cured at 115° C. for 15 minutes and tested after 24 h RT [MPa] | 11.6 | 4.7 |
| Failure mode | 50% CF 50% SCF | 100% AF |

Substrate used in Table 4 experiment is carbon fiber composite (epoxy based) and was ground by using vacuum grinding. Adhesive layer thickness 0.2 mm; Bonding dimension: 10×25 mm; Cleaning: Heptan; Curing condition: 115° C./15 min; CF stands for cohesive failure; SCF stands for surface close cohesive failure; and AF stands for adhesion failure.

The invention claimed is:

1. A one-component adhesive composition comprising 3 to 50 wt %, based on the total weight of the adhesive composition, of o,o'-diallyl-bisphenol A, 5 to 50 wt %, based on the total weight of the adhesive composition, of a dimeric isocyanate selected from dimeric toluene diisocyanate and dimeric methylene diphenyl diisocyanate encapsulated by deactivating the surface of the dimeric isocyanate with an aliphatic polyamine, an aliphatic polyol having a functionality greater than 2 and a catalyst; wherein the composition has an elastic modulus of above 50 MPa.

2. The composition of claim 1 wherein the catalyst comprises Sn—, Zr, Ti, Bi-metallo-organic compound or mixture thereof.

3. The composition of claim 1, wherein the catalyst comprises Bi-neodecanoate.

4. The composition of claim 1 wherein the catalyst is a Sn—, Zr—, Ti— or Bi-metallo-organic compound in combination with chelating ligands.

* * * * *